March 21, 1967 ICHIRO YOSHIYAMA ET AL 3,309,974
EXPOSURE CONTROL MECHANISM
Filed April 20, 1964 3 Sheets-Sheet 2

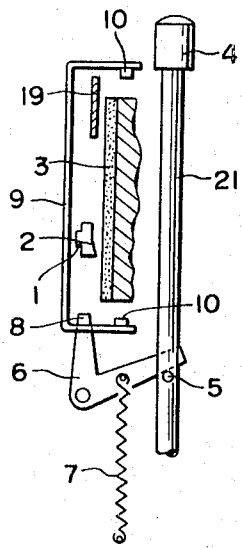
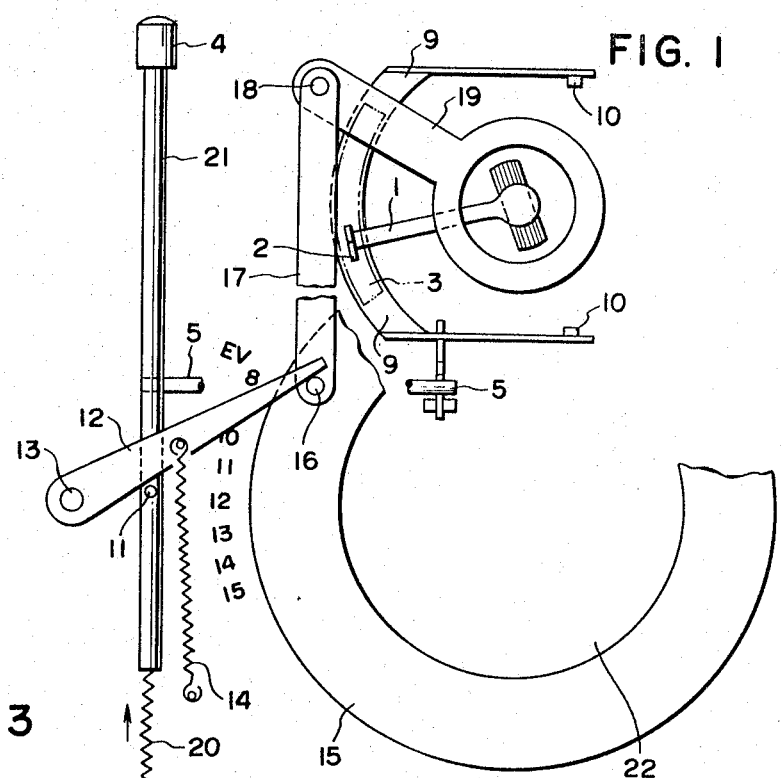
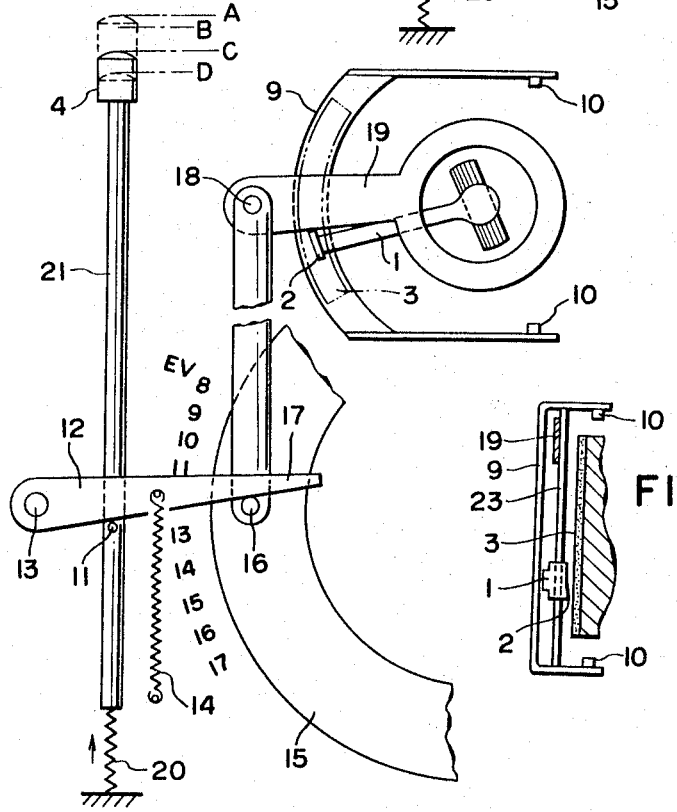
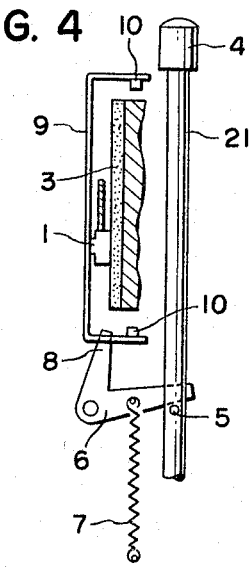
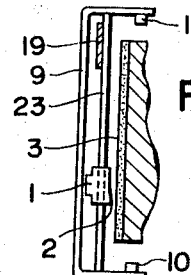

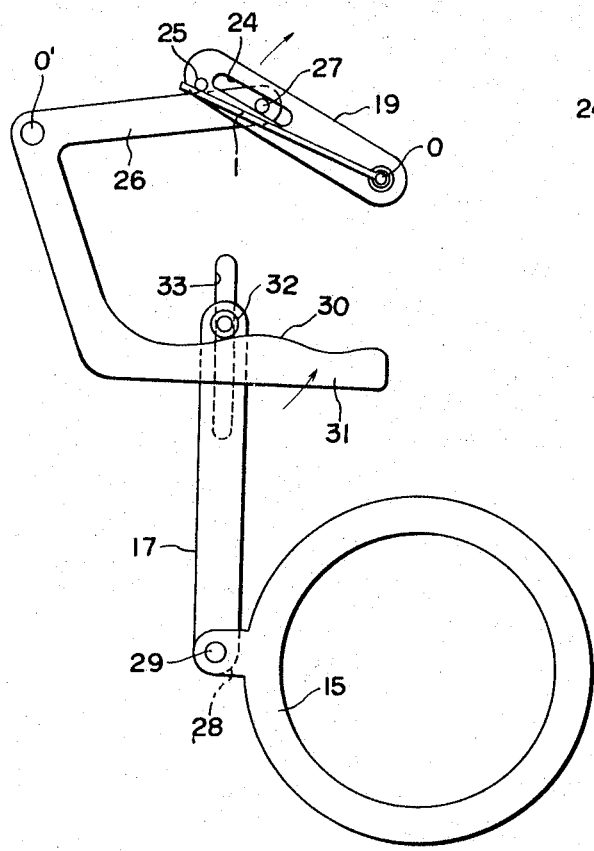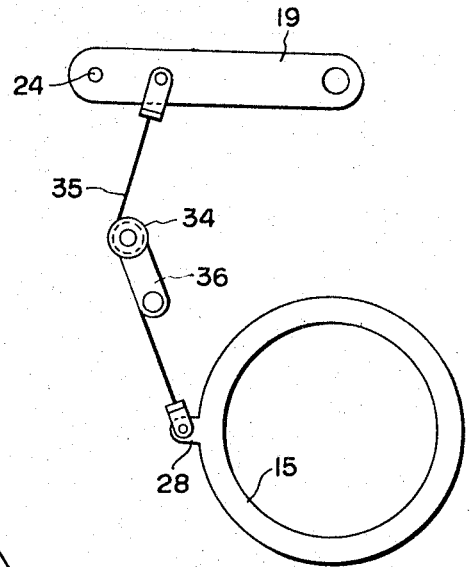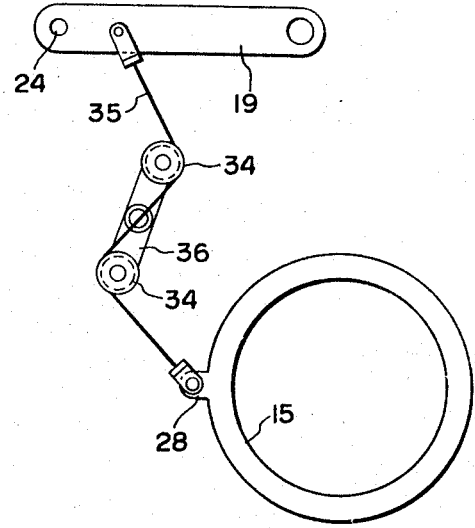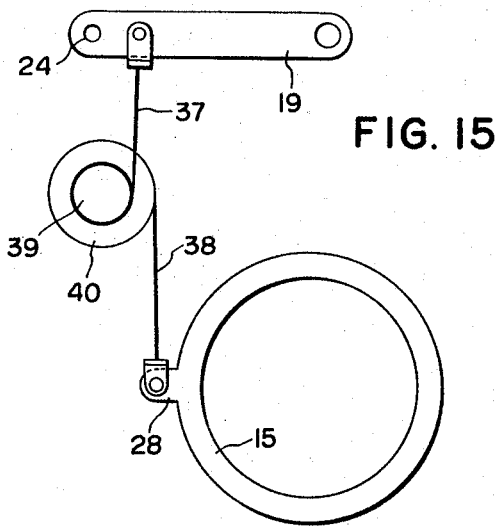

3,309,974
EXPOSURE CONTROL MECHANISM
Ichiro Yoshiyama, Toyokawa, Tatsuo Kobayashi, Kaizuka, and Masaichiro Konishi, Nishinomiya, Japan, assignors to Minolta Camera Kabushiki Kaisha, Minami-ku, Osaka, Japan, a corporation of Japan
Filed Apr. 20, 1964, Ser. No. 360,872
Claims priority, application Japan, Apr. 24, 1963, 38/21,433
6 Claims. (Cl. 95—10)

The present invention relates to a program camera having an automatic exposure controlling device.

In a camera equipped with a mechanism for automatically controlling the amount of exposure in the camera, it is important to obtain an excellent setting means for an indicator needle serving as a stopper, for such stopper, in turn, controls the setting of respective positions of exposure-controlling elements, which comprises a shutter and diaphragm. For this purpose, fixing is conventionally effected by engaging the needle with a saw-toothed fixing member. In such method, maximum mechanical transmission error of one-half pitch of saw-tooth usually occurs. Therefore, such a mechanism can never accurately transmit the proper setting pointed by the indicator needle to the exposure controlling member.

Moreover, an exposure meter interlocking automatic controlling mechanism conventionally used for a still camera is the so-called motion-stopping mechanism. This is a mechanism wherein an exposure controlling device is defined as a predetermined position immediately before the exposure, which is dependent primarily on the brightness of objects to be photographed. In contrast thereto, our program camera is settable in accordance with a number of parameters in order to obtain more evenly exposed pictures. The characterizing features of the automatic exposure controlling mechanism interlocked with an exposure meter are listed as the following:

(1) Characteristic features of oscillating angles ($\theta$) of an ammeter in compliance with brightness value (BV) of objects to be photographed.

(2) Exposure controlling mechanism having exposure characteristics ($EV=AV+TV$) corresponding to the exposure value (EV), actuating angle or displacement ($\theta'$) for the controlling mechanism. The exposure value is hereinafter referred to as EV, while AV is the aperture value, and TV is the time value.

(3) Interlocking mechanism having a characteristic relation [$\theta=f(\theta')$] for the actual controlling of exposure through oscillation ange ($\theta$) of ammeter in proportional response to the actuating angle ($\theta'$) of the controlling mechanism.

(4) Exposure controlling mechanism is also affected by another parameter, namely, film-sensitiveness (SV), which is involved in aforementioned subject matter (1) through the camera mechanism. ($BV+SV$) may correspond to the oscillation angle ($\theta$). In said subject matter (2), as an expression: ($EV-SV$), this may sometimes be involved. Furthermore, the interlocking conditions and errors for said exposure controlling operation are explained according to APEX system. Requirements are only in that ($BV+SV=EV$) be satisfied. Errors in exposure are shown by ($BV+SV-EV=\Delta EV$).

It is an object of the present invention to transfer the amount of exposure indicated by exposure meters to the exposure controlling member accurately; and another object is to provide a sufficient resistance of the fixed indicator needle against a strong impact strength of a scanning lever. In order to accomplish such an object, the present camera is provided with a soft elastic member, such as a rubber strip on a surface extending over the oscillating angle of the indicator needle, in such a manner that said indicator needle may be fixed or retained on the soft elastic member by a pushing member at the position of the indicator needle being selected in accordance with the brightness of the object to be photographed.

Another object of the present invention is to construct an interlocking mechanism for exposure meters wherein the angle of rotation or oscillation ($\theta$) of the indicator needle of the ammeter, is proportionately transmitted to the exposure controlling mechanism in accordance with the relationship of ($\theta$)$=a(\theta')$, wherein $a$ is a constant.

The present invention will be further described in connection with each embodiment as illustrated in the accompanying drawings in which:

FIG. 1 is a front view of an automatic exposure controlling device for a program camera, illustrating essential parts of the operational mechanism;

FIG. 2 is a partial side view thereof;

FIG. 3 is a front view illustrating the sequence of operation of the mechanism of FIG. 1;

FIG. 4 is a partial side view thereof;

FIG. 6 is a side view thereof;

Figure 8:
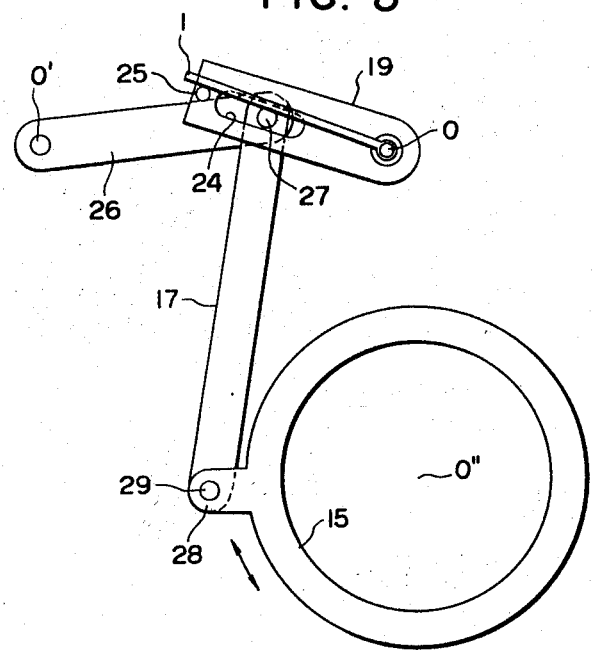
Figure 9:
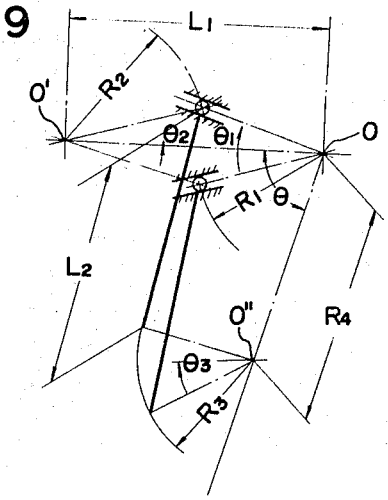
Figure 11:
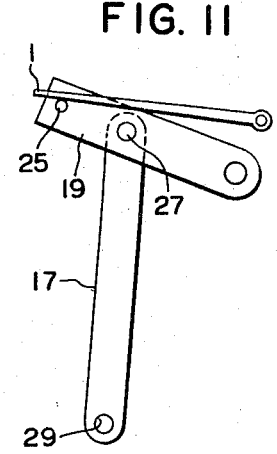

FIG. 7($a$), ($b$), ($c$), ($d$) are oblique views of alternative embodiments of the indicating needle;

FIG. 8 is a front view of the basic embodiment of the automatic exposure controlling mechanism for another program camera constructed according to this invention;

FIG. 9 is a diagram showing the mathematical relationship involved in said mechanism;

FIG. 10$a$ is a graph showing the relation between the oscillation angle and the sum of the brightness valve and film sensitiveness;

FIG. 10$b$ is a graph showing the relation between the oscillation angle and the exposure valves;

FIG. 10$c$ is a graph showing the summation of FIGS. 10$a$ and 10$b$;

FIG. 11 is a partial front view illustrating a modification of the embodiment shown in FIG. 8; and FIGS. 12 to 15 are partial front views illustrating alternative embodiments for accomplishing said objects.

However, the present invention is not limited by what have been described in the text and illustrated in the accompanying drawings, and, of course, various modifications could be effected, without departing from the spirit and scope of this invention.

It is noted in the drawings that similar parts are represented by similar numerical symbols throughout the figures.

Referring to the drawings, by 1 is meant an indicator needle, 2 a sharp pointed edge, 3 a soft elastic sheet, for instance, of rubber, 4 a push button, 5 a lever, 6 a bell crank, 7 a spring, 8 one end of said bell crank, 9 a push board or yoke and 10 a pivot pin respectively. As shown in FIGS. 1 and 2, the sharp-pointed edge 2 is provided at the front end of needle 1, and below said sharp edge 2 is a soft elastic sheet 3. Sheet 3 is spaced from sharp edge 2 and takes the form of a circular arc along the path of oscillation of indicator needle 1, relative to the camera body (not shown in the drawing). The push board or yoke 9 is arranged behind edge 2. Both leg-ends of said push board 9 are secured to said camera body respectively through each pivot pin 10. Further, the push board 9 is in the form of a circular arc similar to that of the soft elastic sheet 3. The sharp-pointed edge 2 of indicator needle 1 is retained in position relative to yoke 9 by pivoting yoke 9 so that the soft elastic sheet 3 is engaged by edge 2 of indicator needle 1.

The scanning lever 19 is coaxial with the indicator needle 1 and is on the same side of yoke 9 as the indicator needle 1. The extremity of the lever 19 extends between the push board or yoke 9 and soft elastic sheet 3 and is connected to a connecting rod 17 at its upper end. The lower end of said connecting rod 17 is connected with a pin 16 fixed on an exposure-determining ring 15 (abbreviated as EV ring hereinafter). Furthermore, one end of a restoration or resetting lever 12 is engaged with the pin 16, while the other end of said lever 12 being pivoted on pin 13 with the main camera body (not illustrated), said restoration lever 12 being always pulled downwards by means of a spring 14. A longitudinally movable shutter actuating lever 21 is provided in said main body and has a push button 4 at the upper end which is always pushed upwards by a lifting force. Such force, which is caused by spring 20, raises the middle portion of restoration lever 12 from its lower side through a pin 11 provided at the middle of said actuating rod against tension of spring 14. A lever 5 is further provided at the middle portion of shutter actuating lever 21. Lever 5 extends toward push board 9 which pivots into engagement with the indicator needle 1. The front end of said lever lifts one end of bell crank 6 against the spring force of the spring 7 always energizing downwardly, the other end 8 of said bell crank 6 is inserted in a hole provided in the leg of push board 9, so as to transmit the rotation of said bell crank to the push board. Furthermore, 22 indicates an exposure controlling portion for the main objective lens, which is located within ring 15, but is not shown.

Now, the manner of operating the automatic exposure controlling device of the aforementioned construction is described in connection with FIGS. 3 and 4. When the photographing is not effected in the camera, the push button 4 is raised to (A) as shown in FIGS. 1 and 2. When the object to be photographed becomes visible through a finder (unillustrated), the push button 4 is pushed down to be photographed and comes to the position (B), the lever 5 of shutter actuating lever 21 will rotate the bell crank 6 against spring force from the spring 7. Consequently, push board or yoke 9 is rotated to cause indicator needle 1 to adhere to the soft-elastic sheet 3. In this case, since the needle 1 has been already oscillated to the position corresponding to the brightness of the object to be photographed, the sharp edge 2 on the front end of said indicator needle is inserted in the soft elastic sheet 3 with the result that said needle is fixed at such position. The restoration bar 12 is pivoted by means of spring 14, and the front end rotates until the needle 1 comes into engagement with EV ring 15 and scanning lever 19 connecting therewith. Thus, the amount of exposure is determined and the shutter (not shown) drops to complete the photographing, while push button 4 is pushed from symbols (C) to (D). In this embodiment at the beginning of pushing by push button EV the ring 15 rotates together with the scanning lever 19. But, it is generally designed so that operation may be out of effective operation range, until the indicator needle 1 is arrested. In the next place, when the push button 4 is released, said push button 4 will be returned to the initial position by spring 20. As the restoration of button 4 causes each of the working parts to return to its respective original position, the pushing of indicator needle 1 will be also released, and said needle 1 will leave the soft elastic sheet 3 by virtue of its own elasticity.

Figure 5:
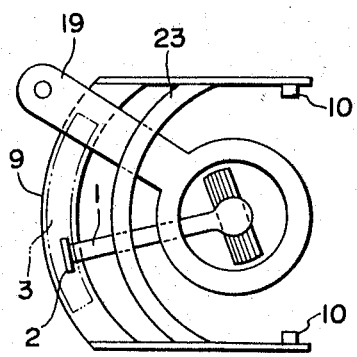
FIG. 5 is a front view of another embodiment of the present invention.
Figures 7A, 7B, 7C, 7D:
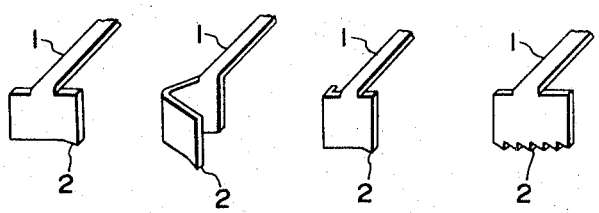

As described above, however, the needle 1 is, of course, sometimes unable to free itself from the soft elastic sheet 3 only by its own elasticity. The modification shown in FIGS. 5 and 6 may be provided in order that said indicator needle 1 may leave the soft elastic sheet 3 without fail. A needle lifting lever 23 is provided below the needle 1 and between the two legs of push board 9, thereby releasing the front end of said indicator needle 1 from sheet 3. The indicator needle 1 is positioned between the push board 9 and lifting lever 23, but is held spaced from said two members. In this case, the scanning lever 19 is also designed to be between both members. Moreover, the sharp edge 2 at the front end of needle 1 must be firmly inserted into the soft elastic sheet 3 in order to resist the impact of scanning lever 19. For this purpose, the embodiments illustrated, for instances, by FIGS. 7(a), (b), (c) and (d) are suitable. The simplest construction is illustrated in FIG. 7(a), formed by folding the front end of needle 1 at right angle with the sharp edge 2 is protruding at its lower end. Since the needle 1 is formed from extremely thin material, the portion where the scanning lever 19 strikes may be deformed after repeated operations. In order to avoid such deformation, the front end of needle 1 may be bent as shown in FIGS. 7(b), (c) to reinforce the thickness. As shown in FIG. 7(d), when the end coming in contact with soft elastic sheet 3 is the pointed sharp edge 2, the fixing of indicator needle 1 will be further enhanced. In this case since the fixing is accomplished by a number of saw teeth, the possibility of damaging the soft elastic sheet is reduced.

Another automatic exposure controlling mechanism is illustrated in FIGS. 8 to 15, for reducing interlocking errors by improving the exposure condition of the exposure controlling mechanism. In FIG. 8, wherein the fundamental embodiment for said mechanism is illustrated not only a guide groove 24 is formed on the scanning lever 19, but also a striking pin 25 is formed at the front end portion thereof. In this case, the indicator needle 1 of an ammeter, scanning lever 19 and fulcrum O are not on the same axial center. Moreover, a pin 27 fixed at the front end of a intermediate guide lever 26 is inserted into the guide groove 24 of scanning lever 19. One end of the lever 17 interlocked with EV ring 15 is connected to the arm 28 of said EV ring through pin 29, the other end of lever 17 being connected to the pin 27 inserted in the guide groove 24 of scanning lever 19.

Thus, in FIG. 8, the oscillating angle of an indicator device of exposure meter, for instance, oscillating angle of indicator needle 1 of the ammeter is determined by the brightness of object to be photographed. The exposure preparation of the main camera body is released, then indicator needle 1 will be stopped at the position for the oscillation angle by virtue of a conventional actuating mechanism, not shown. Then the scanning lever 19 is actuated by an external force such as stored rotating force, lever 19 rotating until the indicator needle 1 is struck with the pin 25 and stopped. Then the pin 27 is driven by guide groove 24 for scanning lever 19, and said pin 27 is restricted at the fulcrum O' of the intermediate guide lever 26 and shifted on its circumference. Therefore, the connecting lever 17 connected with pin 27 is rotated around the center O'' of EV ring 15 with displacement of said pin. Consequently, EV ring 15 is stopped at the rotary angular position determined by indicator needle 1. The desired proportional relationship $(\theta)=f(\theta')$ between the exposure meter and shutter EV controlling ring, has been achieved. The characteristics of interlocking mechanism with the actuating angle $\theta'$ for the controlling mechanism corresponding to the oscillation angle $(\theta)$ in the presence of intermediate guide lever 26 has been established, and the exposing operation is controlled by the amount of exposure determined by the position of the needle 1.

Figure 10A:
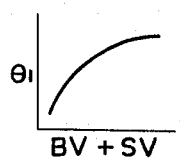
Figure 10B:
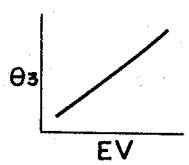
Figure 10C:
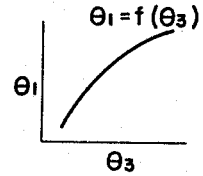

Furthermore, the diagram for the relationship of $(\theta)=f(\theta')$ is illustrated in FIG. 9 and FIG. 10. In this case, the characteristic feature of oscillation angle $(\theta')$ of the indicator-needle 1 of exposure meter corresponding to the brightness value (BV) and film sensitiveness (SV) of the object to be photographed is shown by curves in FIG. 10(a), while on the contrary, the exposure values are linear as shown in FIG. 10(b). In FIG. 9, $R_1=\sin\theta'=R_2\sin\theta_2$. The required relationship of $(\theta')=f(\theta_3)$ is resolved from FIG. 9. In brief, the sum of FIG. 10(a), (b) is illustrated by the curve of FIG. 10(c). $R_1$, $R_2$, $R_3$, and $R_4$, as well as $L_1$, $L_2$, may be determined by the relationships shown in FIG. 9. In the embodiment of FIG. 8, when the center of indicator-needle 1 is different from the center of scanning lever 19, the intermediate guide lever 26 is omitted as shown in FIG. 11, $(\theta) = f(\theta')$ may also be satisfied by directly connecting the EV ring 15 with the intermediate portion of scanning lever 19 by means of pin 29.

An embodiment supplemented with characteristic features in the automatic exposure controlling mechanism is shown in FIG. 12. In this case, a lever 31 having a cam 30 surface is incorporated with the other end of intermediate guide lever 26. The connecting lever 17 is adapted to make a slidable pin 32 provided at the top end thereof slide within a longitudinal groove 33 engraved in the camera body, and is simultaneously adapted to be engaged with cam surface 30 of said lever. Moreover, the oscillation angle of the indicator portion of exposure meter, for instance, such as an indicator-needle 1, is set by the brightness of the object to be photographed. After the position of said needle has been determined or fixed, then the scanning lever 19 is actuated, as in the embodiment shown in FIG. 8. In the construction shown in FIG. 12, the lever 31 acts in conjunction with the intermediate guide lever 26. When the connecting sheet 17 is lifted by the cam 30 through the sliding pin 32, its stroke is compensated by the curved cam surface to satisfy the relationship $(\theta) = f(\theta')$. According to the present embodiment, the compensation is accomplished in two stages, and therefore, EV ring 15 may be actuated smoothly, without disturbances in the whole interlocking controlling mechanism. Hence, there is an advantage of capable of designing the exposure meter so as to keep additional forces applied to the meter portion at a minimum.

In the next place, FIGS. 13 to 25 illustrate other embodiments wherein intermediate guide levers 26 and connecting levers 17 have been omitted, so that the scanning lever 19 is connected with EV ring 15 by strings which are wrapped around a pulley. The embodiment shown in FIG. 13 shows the string 35 wrapped around a single pulley 34, while FIG. 14 shows a case wherein a pair of pulleys 34 is actuated so that the string 35 may be bent, and simultaneously the scanning lever 19 is actuated by the lever 36. In addition, in the embodiment shown in FIG. 15, strings 37 and 38 are connected respectively to the scanning lever 19 and EV ring 15 said strings being wrapped around concentrical pulleys 39 and 40 having different diameters. For instance, the pulley 39 is rotated by the string 37 by lifting up by the scanning lever 19, while the other pulley 40, having a larger diameter lifts the string 38 actuating EV ring 15 in a different stroke from that of string 37 to perform a compensation function according to the characteristics of the controlling formula of $(\theta) = f(\theta')$.

What is claimed is:
1. In an exposure control mechanism for a camera, the combination comprising,
    (a) an exposure meter having an indicator needle adapted to be oscillated in an arc in accordance with the brightness of the object to be photographed,
    (b) the outer edge of said indicator needle being bent perpendicular to the length of said needle,
    (c) teeth means formed on said outer edge,
    (d) a fixed surface positioned below and parallel to said indicator needle,
    (e) an elastic member located on said surface adjacent to said edge of said indicator needle and conforming in shape to the arc of movement of said needle,
    (f) yoke means positioned above and normally parallel to said indicator needle,
    (g) means for pivoting said yoke means into contact with said needle so as to press said teeth into engagement with said elastic member,
    (h) a scanner lever coaxially mounted with said indicator needle for rotation in an arc between said indicator needle and said fixed surface,
    (i) a rotatable exposure valve setting ring adapted to control the shutter setting of the camera,
    (j) actuating means connected at one end to said scanner lever and at the opposite end to said setting ring for adjusting the same,
    (k) restoring means for normally retaining said actuating means in an inoperating condition,
    (l) manually settable operating means for disabling said restoring means and thereby releasing said actuating means, and
    (m) said scanner lever being rotated until arrested at an operative position by engagement with said edge portion of said indicator needle.

2. The combination as defined in claim 1 wherein an indicator needle lifting member is formed on said yoke means, said lifting member being normally positioned above said fixed surface and below said scanner lever, and said lifting member engaging said indicator needle to disengage said teeth from said elastic member when said yoke means is pivoted.

3. The combination as defined in claim 1 wherein said scanner lever has a slot formed therein, and said actuating means includes a pivotably mounted intermediate guide lever having a central portion and a pair of arms extending from said portion, and a pin on one arm extending through said slot in the scanner lever.

4. The combination as defined in claim 3 wherein said other arm has a cam surface formed thereon, and said actuating means comprises a lever having a pin at its upper end, said lever being joined to said rotatable ring, and said pin riding along said cam surface to control the movement of said ring.

5. The combination as defined in claim 1 wherein said actuating means includes pulley means and a string, one end of said string being joined to said rotatable ring and the opposite end being joined to said scanner lever, the intermediate portion of said string being wrapped about said pulley.

6. The combination as defined in claim 1 wherein said actuating means includes a pair of coaxial pulleys with dissimilar diameters and a pair of strings, one string connected at one end to said scanner needle and connected at the opposite end of one of said pulleys, and the second string connected at one end to said rotatable ring and connected at the other end to the other one of said pair of pulleys.

References Cited by the Examiner

UNITED STATES PATENTS 3,044,376   7/1962   Gebele _____ 95—10
3,088,387   5/1963   Wichmann _____ 95—10

JOHN M. HORAN, *Primary Examiner.*